(12) United States Patent
Lee et al.

(10) Patent No.: US 9,951,848 B2
(45) Date of Patent: Apr. 24, 2018

(54) PLANETARY GEAR TRAIN OF AUTOMATIC TRANSMISSION FOR VEHICLE

(71) Applicant: Hyundai Motor Company, Seoul (KR)

(72) Inventors: Kyeong Hun Lee, Seoul (KR); Jong Soo Kim, Seoul (KR); Jong Sool Park, Hwaseong-si (KR); Dong Hwan Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 11 days.

(21) Appl. No.: 15/265,664

(22) Filed: Sep. 14, 2016

(65) Prior Publication Data

US 2017/0219065 A1 Aug. 3, 2017

(30) Foreign Application Priority Data

Feb. 3, 2016 (KR) .......................... 10-2016-0013650

(51) Int. Cl.
*F16H 3/66* (2006.01)
(52) U.S. Cl.
CPC ..... *F16H 3/666* (2013.01); *F16H 2200/0065* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

2014/0371023 A1* 12/2014 Janson ...................... F16H 3/66
475/275

FOREIGN PATENT DOCUMENTS

| DE | 102012224119 A1 * | 6/2014 | ............... F16H 3/66 |
| KR | 10-2011-0131817 (A) | 12/2011 | |
| KR | 1020110131817 A * | 12/2011 | ............... F16H 3/66 |

\* cited by examiner

*Primary Examiner* — Erin D Bishop
*Assistant Examiner* — Lori Wu
(74) *Attorney, Agent, or Firm* — Morgan, Lewis & Bockius LLP

(57) ABSTRACT

A planetary gear train of an automatic transmission for a vehicle may include a first planetary gear set, a second planetary gear set, a third planetary gear set, a fourth planetary gear set, an input shaft mounted with the first, second, and third planetary gear sets at an external circumference of the input shaft, an output shaft disposed in parallel with the input shaft and mounted with the fourth planetary gear set on external circumference of the output shaft, a first shaft, a second shaft directly connected with the input shaft, a third shaft, a fourth shaft gear-meshed with the output shaft, a fifth shaft, a sixth shaft, a seventh shaft, an eighth shaft, a ninth shaft directly connected with the output shaft, a tenth shaft, and transfer gears, each gear-meshed with at least one of the shafts.

18 Claims, 3 Drawing Sheets

FIG. 2

| Shift-stage | Control element | | | | | | Gear ratio | Step ratio | Remark |
| --- | --- | --- | --- | --- | --- | --- | --- | --- | --- |
| | C1 | C2 | C3 | B1 | B2 | B3 | | | |
| D1 | ● | | | | ● | ● | 6.340 | - | Gear ratio span : 9.80 |
| D2 | | ● | | | ● | ● | 4.100 | 1.55 | |
| D3 | | ● | | ● | | ● | 2.896 | 1.42 | |
| D4 | ● | ● | | | | ● | 2.233 | 1.30 | |
| D5 | | ● | ● | | | ● | 1.673 | 1.33 | |
| D6 | ● | | ● | | | ● | 1.303 | 1.28 | |
| D7 | ● | ● | ● | | | | 1.001 | 1.30 | |
| D8 | ● | | ● | | ● | | 0.826 | 1.21 | |
| D9 | | ● | ● | | ● | | 0.647 | 1.28 | |
| REV | | | ● | | ● | ● | 4.857 | - | Ratio of REV vs D1 : 0.77 |

US 9,951,848 B2

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2016-0013650, filed Feb. 3, 2016, the entire contents of which is incorporated herein for all purposes by this reference.

BACKGROUND OF THE INVENTION

Field of the Invention

The present invention relates to an automatic transmission for a vehicle.

Description of Related Art

Recent increases in oil prices are triggering stiff competition in enhancing fuel consumption of a vehicle.

In this sense, research on an automatic transmission has been performed to simultaneously provide better drivability and fuel consumption by achieving more shift stages.

However, in order to achieve more shift stages for an automatic transmission, the number of parts is typically increased, which may deteriorate installability and/or power flow efficiency and may increase production cost, and weight.

Therefore, in order to maximally enhance fuel consumption of an automatic transmission having more shift stages, it is important for better efficiency to be derived by a smaller number of parts.

In this respect, an eight-speed automatic transmission has been recently introduced, and a planetary gear train for an automatic transmission enabling more shift stages is under investigation.

An automatic transmission of eight or more shift-stages typically includes three to four planetary gear sets and five to six control elements (frictional elements), and may easily become lengthy, thereby deteriorating installability.

In this regard, disposing planetary gear sets in parallel or employing dog clutches instead of wet-type control elements is sometimes attempted. However, such an arrangement may not be widely applicable, and using dog clutches may easily deteriorate shift-feel.

In addition, a recent eight-speed automatic transmission typically shows a gear ratio span in a level of 6.5 to 7.5, which may require improvement for better fuel consumption.

Thus, shortening a length of an automatic transmission without deteriorating performance will be beneficial.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing a planetary gear train of an automatic transmission for a vehicle having advantages of realizing at least nine forward speeds and at least one reverse speed by a combination of four planetary gear sets, two external gears and six control elements, thereby providing improvement of power delivery performance and fuel consumption and improving installability by reducing a length.

In addition, various aspects of the present invention are directed to providing a wide available range of varying gear teeth of transfer gears enabling easy obtaining of optimum gear ratios for respective vehicles, thereby improving power delivery performance and fuel consumption.

According to various aspects of the present invention, a planetary gear train of an automatic transmission for a vehicle may include a first planetary gear set including first, second, and third rotational elements, a second planetary gear set including fourth, fifth, and sixth rotational elements, a third planetary gear set including seventh, eighth, and ninth rotational elements, a fourth planetary gear set including tenth, eleventh, and twelfth rotational elements, an input shaft mounted with the first, second, and third planetary gear sets at an external circumference of the input shaft, an output shaft disposed in parallel with the input shaft and mounted with the fourth planetary gear set on external circumference of the output shaft, a first shaft interconnecting the first rotational element and the fourth rotational element, a second shaft connected with the second rotational element and directly connected with the input shaft, a third shaft interconnecting the third rotational element and the eighth rotational element, a fourth shaft connected with the fifth rotational element and gear-meshed with the output shaft, a fifth shaft connected with the sixth rotational element, a sixth shaft connected with the seventh rotational element, a seventh shaft connected with the ninth rotational element, an eighth shaft connected with the tenth rotational element, a ninth shaft connected with the eleventh rotational element and directly connected with the output shaft, a tenth shaft connected with the twelfth rotational element, and transfer gears, each gear-meshed with at least one of the shafts, in which one shaft among the eighth and tenth shafts may be selectively connected with a transmission housing and another shaft among the eighth and tenth shafts may be gear-meshed with the third shaft.

The first planetary gear set may include a first sun gear as the first rotational element, a first planet carrier as the second rotational element, and a first ring gear as the third rotational element, the second planetary gear set may include a second sun gear as the fourth rotational element, a second planet carrier as the fifth rotational element, and a second ring gear as the sixth rotational element, the third planetary gear set may include a third sun gear as the seventh rotational element, a third planet carrier as the eighth rotational element, and a third ring gear as the ninth rotational element, and the fourth planetary gear set may include a fourth sun gear as the tenth rotational element, a fourth planet carrier as the eleventh rotational element, and a fourth ring gear as the twelfth rotational element.

A pinion supported by the second planet carrier acting as the fifth rotational element may be a 2-stage pinion including a smaller diameter portion and a larger diameter portion, and the smaller diameter portion may be gear-meshed with the second sun gear acting as the fourth rotational element, and the larger diameter portion may be gear-meshed with the second ring gear acting as the sixth rotational element.

The fifth shaft may be selectively connected with the transmission housing, the sixth shaft may be selectively connected with the first, second, and fifth shafts respectively, and the seventh shaft may be selectively connected with the transmission housing.

The eighth shaft may be gear-meshed with the third shaft, and the tenth shaft may be selectively connected with the transmission housing.

The transfer gears may include a first transfer gear disposed between the fourth shaft and the output shaft, and a second transfer gear disposed between the third shaft and the eighth shaft.

The planetary gear train may further include a first clutch disposed between the second shaft and the sixth shaft, a second clutch disposed between the first shaft and the sixth shaft, a third clutch disposed between the fifth shaft and the sixth shaft, a first brake disposed between the fifth shaft and the transmission housing, a second brake disposed between the seventh shaft and the transmission housing, and a third brake disposed between the tenth shaft and the transmission housing.

The eighth shaft may be selectively connected with the transmission housing, and the tenth shaft may be gear-meshed with the third shaft.

The transfer gears may include a first transfer gear disposed between the fourth shaft and the output shaft, and a second transfer gear disposed between the third shaft and the tenth shaft.

The planetary gear train may further include a first clutch disposed between the second shaft and the sixth shaft, a second clutch disposed between the first shaft and the sixth shaft, a third clutch disposed between the fifth shaft and the sixth shaft, a first brake disposed between the fifth shaft and the transmission housing, a second brake disposed between the seventh shaft and the transmission housing, and a third brake disposed between the eighth shaft and the transmission housing.

According to various aspects of the present invention, a planetary gear train of an automatic transmission for a vehicle may include a first planetary gear set including first, second, and third rotational elements, a second planetary gear set including fourth, fifth, and sixth rotational elements, a third planetary gear set including seventh, eighth, and ninth rotational elements, a fourth planetary gear set including tenth, eleventh, and twelfth rotational elements, an input shaft mounted with the first, second, and third planetary gear sets at an external circumference of the input shaft, and an output shaft disposed in parallel with the input shaft and mounted with the fourth planetary gear set on external circumference of the output shaft, in which the first rotational element may be directly connected with the fourth rotational element, the second rotational element may be directly connected with the input shaft, the third rotational element may be directly connected with the eighth rotational element and gear-meshed with one rotational element among the tenth and twelfth rotational elements, the fifth rotational element may be gear-meshed with the output shaft through a first transfer gear, the sixth rotational element may be selectively connected with a transmission housing, the ninth rotational element may be selectively connected with the transmission housing, the eleventh rotational element may be directly connected with the output shaft, and a remaining rotational element, among the tenth and twelfth rotational elements, excluding a rotational element gear-meshed with the third rotational element may be selectively connected with the transmission housing.

The second rotational element may be selectively connected with the seventh rotational element, the first rotational element may be selectively connected with the seventh rotational element, and the sixth rotational element may be selectively connected with the seventh rotational element.

The third rotational element may be gear-meshed with the tenth rotational element through a second transfer gear, and the twelfth rotational element may be selectively connected with the transmission housing.

The planetary gear train may further include a first clutch selectively connecting the second rotational element and the seventh rotational element, a second clutch selectively connecting the first rotational element and the seventh rotational element, a third clutch selectively connecting the sixth rotational element and the seventh rotational element, a first brake selectively connecting the sixth rotational element with the transmission housing, a second brake selectively connecting the ninth rotational element with the transmission housing, and a third brake selectively connecting the twelfth rotational element with the transmission housing.

The third rotational element may be gear-meshed with the twelfth rotational element through a second transfer gear, and the tenth rotational element may be selectively connected with the transmission housing.

The planetary gear train may further include a first clutch selectively connecting the second rotational element and the seventh rotational element, a second clutch selectively connecting the first rotational element and the seventh rotational element, a third clutch selectively connecting the sixth rotational element and the seventh rotational element, a first brake selectively connecting the sixth rotational element with the transmission housing, a second brake selectively connecting the ninth rotational element with the transmission housing, and a third brake selectively connecting the tenth rotational element with the transmission housing.

According to a planetary gear train of various embodiments of the present invention, planetary gear sets are dividedly arranged on input and output shafts disposed in parallel, thereby reducing a length and improving installability.

According to a planetary gear train of various embodiments of the present invention, at least eight forward speeds and at least one reverse speed are realized by employing two transfer gears in addition to a combination of planetary gear sets, thereby providing a wide range of varying gear teeth so as to easily achieve optimum gear ratio and to easily comply with required performance for respective vehicles.

In addition, according to a planetary gear train of various embodiments of the present invention, a gear ratio span of more than 9.8 may be achieved while realizing at least nine forward speeds and at least one reverse speed, thereby maximizing an engine driving efficiency.

Furthermore, the linearity of step ratios of shift stages is secured while multi-staging the shift stage with high efficiency, thereby making it possible to improve drivability such as acceleration before and after a shift, an engine speed rhythmic sense, and the like.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift-stages in a planetary gear train according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
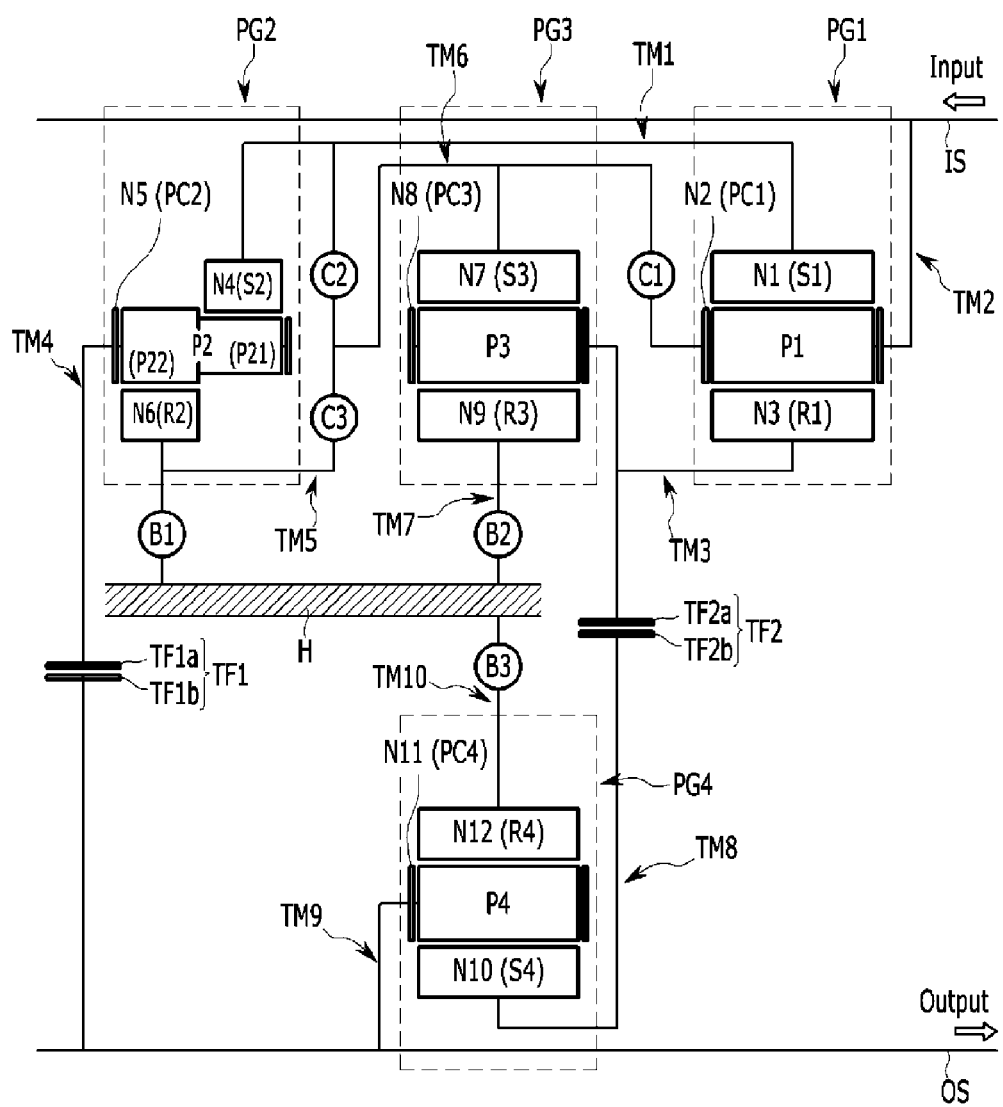
FIG. 1 is a schematic diagram of a planetary gear train according to various embodiments of the present invention.

FIG. 1 is a schematic diagram of a planetary gear train according to various embodiments of the present invention.

Referring to FIG. 1, a planetary gear train according to various embodiments of the present invention includes an input shaft IS, an output shaft OS, first, second, third, and fourth planetary gear sets PG1, PG2, PG3, and PG4, two transfer gears TF1 and TF2, and control elements of three clutch C1, C2, and C3 and three brakes B1, B2, and B3.

The input shaft IS is an input member and the torque from a crankshaft of an engine is input into the input shaft IS, after being torque-converted through a torque converter.

The output shaft OS is an output member, and, arranged in parallel with the input shaft IS, outputs a shifted driving torque to a drive shaft through a differential apparatus.

The first, second, and third planetary gear sets PG1, PG2, and PG3 are arranged at external circumference of the input shaft IS and form a main shifting portion. With respect to the third planetary gear set PG3, the first planetary gear set PG1 is arranged toward an engine side, and the second planetary gear set PG2 is arranged toward an opposite side of the engine.

The fourth planetary gear set PG4 is arranged at external circumference of the output shaft OS disposed in parallel with the input shaft IS and forms an auxiliary shifting portion.

The first planetary gear set PG1 is a single pinion planetary gear set, and includes a first sun gear S1, a first planet carrier PC1 that supports first pinion P1 externally engaged with the first sun gear S1, and a first ring gear R1 that is internally engaged with the first pinion P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that supports second pinion P2 externally engaged with the second sun gear S2, and a second ring gear R2 that is internally engaged with the second pinion P2. The second sun gear S2 acts as a fourth rotational element N4, the second planet carrier PC2 acts as a fifth rotational element N5, and the second ring gear R2 acts as a sixth rotational element N6.

The second pinion P2 is a 2-stage pinion having a smaller diameter portion P21 and a larger diameter portion P22. The smaller diameter portion P21 is externally gear-meshed the second sun gear S2, and the larger diameter portion P22 is internally gear-meshed with the second ring gear R2.

Such a 2-stage pinion planetary gear set may contribute to achieving a speed ratio of 1 to 1.5 that might not obtained by a single pinion planetary gear set, thereby increasing a gear ratio span and enhancing a step ratio linearity. Such a 2-stage pinion planetary gear set typically shows higher gear efficiency in comparison with a double pinion planetary gear set that shows poor gear efficiency.

The third planetary gear set PG3 is a single pinion planetary gear set, and includes a third sun gear S3, a third planet carrier PC3 that supports third pinion P3 externally engaged with the third sun gear S3, and a third ring gear R3 that is internally engaged with the third pinion P3. The third sun gear S3 acts as a seventh rotational element N7, the third planet carrier PC3 acts as an eighth rotational element N8, and the third ring gear R3 acts as a ninth rotational element N9.

The fourth planetary gear set PG4 is a single pinion planetary gear set, and includes a fourth sun gear S4, a fourth planet carrier PC4 that supports fourth pinion P4 externally engaged with the fourth sun gear S4, and a fourth ring gear R4 that is internally engaged with the fourth pinion P4. The fourth sun gear S4 acts as a tenth rotational element N10, the fourth planet carrier PC4 acts as a eleventh rotational element N11, and the fourth ring gear R4 acts as a twelfth rotational element N12.

In the arrangement of the first, second, and third planetary gear sets PG1, PG2, and PG3, the first rotational element N1 is directly connected with the fourth rotational element N4, the third rotational element N3 is directly connected with the eighth rotational element N8, by seven shafts TM1 to TM7.

Three shafts TM8 to TM10 are connected to the fourth planetary gear set PG4.

The ten shafts TM1 to TM10 are hereinafter described in detail.

The first shaft TM1 interconnects the first rotational element N1 (first sun gear S1) and the fourth rotational element N4 (second sun gear S2).

The second shaft TM2 is connected with the second rotational element N2 (first planet carrier PC1), and directly connected with the input shaft IS, thereby always acting as an input element.

The third shaft TM3 interconnects the third rotational element N3 (first ring gear R1) and the eighth rotational element N8 (third planet carrier PC3).

The fourth shaft TM4 is connected with the fifth rotational element N5 (second planet carrier PC2), and externally gear-meshed with the output shaft OS.

The fifth shaft TM5 is connected with the sixth rotational element N6 (second ring gear R2), and is selectively connected with the transmission housing H, thereby selectively acting as a fixed element.

The sixth shaft TM6 is connected with the seventh rotational element N7 (third sun gear S3), and selectively connected with the first, second, fifth shaft TM1, TM2, and TM5.

The seventh shaft TM7 is connected with the ninth rotational element N9 (third ring gear R3), and selectively connected with the transmission housing H, thereby selectively acting as a fixed element.

The eighth shaft TM8 is connected with the tenth rotational element N10 (fourth sun gear S4), and externally gear-meshed with the third shaft TM3.

The ninth shaft TM9 is connected with the eleventh rotational element N11 (fourth planet carrier PC4), and directly connected with the output shaft OS, thereby always acting as an output element.

The tenth shaft TM10 is connected with the twelfth rotational element N12 (fourth ring gear R4), and selectively connected with the transmission housing H, thereby selectively acting as a fixed element.

The two transfer gear TF1 and TF2 delivers a shifted torque of the main shifting portion having the first, second, and third planetary gear sets PG1, PG2, and PG3 to the auxiliary shifting portion having the fourth planetary gear set PG4, in a reverse rotation.

The first transfer gear TF1 includes a first transfer drive gear TF1a directly connected with the fourth shaft TM4 and a first transfer driven gear TF1b directly connected with the output shaft OS, and externally gear-meshes the fourth shaft TM4 and the output shaft OS.

The second transfer gear TF2 includes a second transfer drive gear TF2a directly connected with the third shaft TM3 and a second transfer driven gear TF2b directly connected with the eighth shaft TM8, and externally gear-meshes the third shaft TM3 and the eighth shaft TM8.

Respective shafts connected by the first and second transfer gears TF1 and TF2 rotate in opposite directions, and the gear ratios of the first and second transfer gears TF1 and TF2 may be preset in consideration of required speed ratio of the transmission.

The control elements include three clutches C1, C2, and C3 and three brakes B1, B2, and B3, and are arranged as follows.

The first clutch C1 is arranged between the second shaft TM2 and the sixth shaft TM6, such that the second shaft TM2 and the sixth shaft TM6 may selectively become integral.

The second clutch C2 is arranged between the first shaft TM1 and the sixth shaft TM6, such that the first shaft TM1 and the sixth shaft TM6 may selectively become integral.

The third clutch C3 is arranged between the fifth shaft TM5 and the sixth shaft TM6, such that the fifth shaft TM5 and the sixth shaft TM6 may selectively become integral.

The first brake B1 is arranged between the fifth shaft TM5 and the transmission housing H, such that the fifth shaft TM5 may selectively act as a fixed element.

The second brake B2 is arranged between the seventh shaft TM7 and the transmission housing H, such that the seventh shaft TM7 may selectively act as a fixed element.

The third brake B3 is arranged between the tenth shaft TM10 and the transmission housing H, such that the tenth shaft TM10 may selectively act as a fixed element.

The control elements of the first, second, and third clutch C1, C2, and C3 and the first, second, third brake B1, B2, and B3 may be realized as multi-plate hydraulic pressure friction devices that are frictionally engaged by hydraulic pressure.

FIG. 2 is an operational chart for respective control elements at respective shift-stages in a planetary gear train according to various embodiments of the present invention.

Referring to FIG. 2, a planetary gear train according to various embodiments of the present invention realizes shifting by operating three control elements among the three clutches C1, C2, and C3 and the three brakes B1, B2, and B3.

The Forward First Speed

In the forward first speed shift-stage D1, the first clutch C1 and the second and third brakes B2 and B3 are operated.

As a result, the second shaft TM2 is connected with the sixth shaft TM6 by the operation of the first clutch C1. In this state, the torque of the input shaft IS is input to the second shaft TM2, and the seventh shaft TM7 and the tenth shaft TM10 act as fixed elements by the operation of the second brake B2 and the third brake B3, thereby realizing the forward first speed by cooperative operation of respective shafts and outputting a shifted torque to the output shaft OS connected with the ninth shaft TM9.

The Forward Second Speed

In the forward second speed shift-stage D2, the second clutch C2 and the second and third brakes B2 and B3 are operated.

As a result, the first shaft TM1 is connected with the sixth shaft TM6 by the operation of the second clutch C2. In this state, the torque of the input shaft IS is input to the second shaft TM2, and the seventh shaft TM7 and the tenth shaft TM10 act as fixed elements by the operation of the second brake B2 and the third brake B3, thereby realizing the forward second speed by cooperative operation of respective shafts and outputting a shifted torque to the output shaft OS connected with the ninth shaft TM9.

The Forward Third Speed

In the forward third speed shift-stage D3, the second clutch C2 and the first and third brakes B1 and B3 are operated.

As a result, in the main shifting portion, the first shaft TM1 is connected with the sixth shaft TM6 by the operation of the second clutch C2. In this state, the torque of the input shaft IS is input to the second shaft TM2, and the fifth shaft TM5 and the tenth shaft TM10 act as fixed elements by the operation of the first brake B1 and the third brake B3, thereby realizing the forward third speed by cooperative operation of respective shafts and outputting a shifted torque to the output shaft OS connected with the ninth shaft TM9.

The Forward Fourth Speed

In the forward fourth speed shift-stage D4, the first and second clutch C1 and C2 and the third brake B3 are operated.

As a result, the second shaft TM2 is connected with the sixth shaft TM6 by the operation of the first clutch C1, and the first shaft TM1 is connected with the sixth shaft TM6 by the operation of the second clutch C2. In this state, the torque of the input shaft IS is input to the second shaft TM2, and the tenth shaft TM10 acts as a fixed element by the operation of the third brake B3, thereby realizing the forward fourth speed by cooperative operation of respective shafts and outputting a shifted torque to the output shaft OS connected with the ninth shaft TM9.

The Forward Fifth Speed

In the forward fifth speed shift-stage D5, the second and third clutches C2 and C3 and the third brake B3 are operated.

As a result, the first shaft TM1 is connected with the sixth shaft TM6 by the operation of the second clutch C2, and the fifth shaft TM5 is connected with the sixth shaft TM6 by the operation of the third clutch C3. In this state, the torque of the input shaft IS is input to the second shaft TM2, and the tenth shaft TM10 acts as a fixed element by the operation of the third brake B3, thereby realizing the forward fifth speed by cooperative operation of respective shafts and outputting a shifted torque to the output shaft OS connected with the ninth shaft TM9.

The Forward Sixth Speed

In the forward sixth speed shift-stage D6, the first and third clutches C1 and C3 and the third brake B3 are operated.

As a result, the second shaft TM2 is connected with the sixth shaft TM6 by the operation of the first clutch C1, and the fifth shaft TM5 is connected with the sixth shaft TM6 by the operation of the third clutch C3. In this state, the torque of the input shaft IS is input to the second shaft TM2, and the tenth shaft TM10 acts as a fixed element by the operation of the third brake B3, thereby realizing the forward sixth speed by cooperative operation of respective shafts and outputting a shifted torque to the output shaft OS connected with the ninth shaft TM9.

The Forward Seventh Speed

In the forward seventh speed shift-stage D7, the first, second, and third clutches C1, C2, and C3 are operated.

As a result, the second shaft TM2 is connected with the sixth shaft TM6 by the operation of the first clutch C1, the first shaft TM1 is connected with the sixth shaft TM6 by the operation of the second clutch C2, and the fifth shaft TM5 is connected with the sixth shaft TM6 by the operation of the third clutch C3. In this state, the torque of the input shaft IS is input to the second shaft TM2, thereby realizing the forward seventh speed by cooperative operation of respective shafts and outputting a shifted torque to the output shaft OS connected with the ninth shaft TM9.

The Forward Eighth Speed

In the forward eighth speed shift-stage D8, the first and third clutches C1 and C3 and the second brake B2 are operated.

As a result, the second shaft TM2 is connected with the sixth shaft TM6 by the operation of the first clutch C1, and the fifth shaft TM5 is connected with the sixth shaft TM6 by the operation of the third clutch C3. In this state, the torque of the input shaft IS is input to the second shaft TM2, and the seventh shaft TM7 acts as a fixed element by the operation of the second brake B2, thereby realizing the forward eighth speed by cooperative operation of respective shafts and outputting a shifted torque to the output shaft OS connected with the ninth shaft TM9.

The Forward Ninth Speed

In the forward ninth speed shift-stage D9, the second and third clutches C2 and C3 and the second brake B2 are operated.

As a result, the first shaft TM1 is connected with the sixth shaft TM6 by the operation of the second clutch C2, and the fifth shaft TM5 is connected with the sixth shaft TM6 by the operation of the third clutch C3. In this state, the torque of the input shaft IS is input to the second shaft TM2, and the seventh shaft TM7 acts as a fixed element by the operation of the second brake B2, thereby realizing the forward ninth speed by cooperative operation of respective shafts and outputting a shifted torque to the output shaft OS connected with the ninth shaft TM9.

The Reverse Speed

In the reverse speed REV, the third clutch C3 and the second and third brakes B2 and B3 are operated.

As a result, the fifth shaft TM5 is connected with the sixth shaft TM6 by the operation of the third clutch C3. In this state, the torque of the input shaft IS is input to the second shaft TM2, and the seventh shaft TM7 and the tenth shaft TM10 act as fixed elements by the operation of the second brake B2 and the third brake B3, thereby realizing the reverse speed by cooperative operation of shafts and outputting a shifted torque to the output shaft OS connected with the ninth shaft TM9.

FIG. 2 shows gear ratios calculated under the condition that the gear ratio of the first ring gear R1/the first sun gear S1 is 1.20, the gear ratio of the second ring gear R2/the second sun gear S2 is 2.69, the gear ratio of the third ring gear R3/the third sun gear S3 is 1.84, the gear ratio of the fourth ring gear R4/the fourth sun gear S4 is 1.86, the gear ratio of the first transfer driven gear TF1$b$/the first transfer drive gear TF1$a$ is 1.00, and the gear ratio of the second transfer driven gear TF2$b$/the second transfer drive gear TF2$a$ is 0.78.

Figure 3:
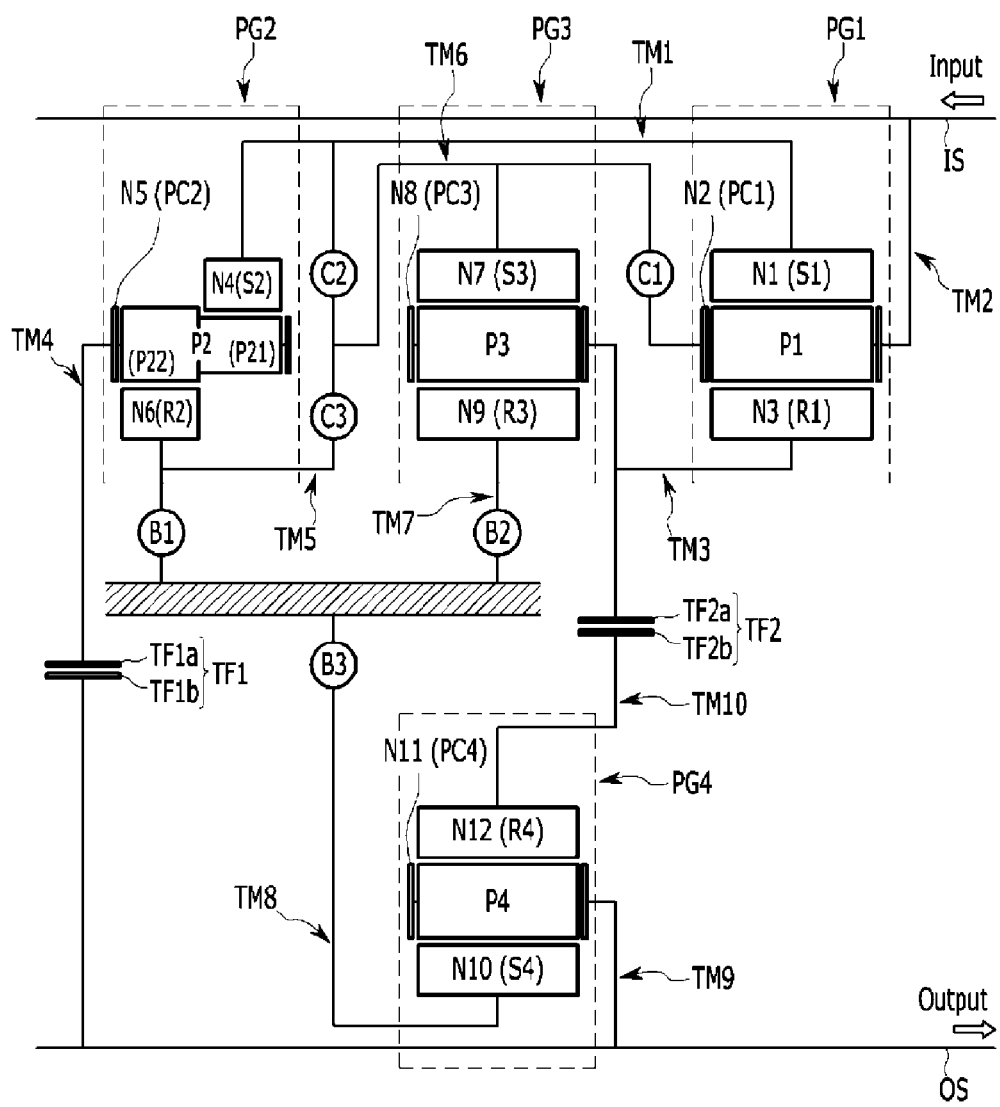
FIG. 3 is a schematic diagram of a planetary gear train according to various embodiments of the present invention.

FIG. 3 is a schematic diagram of a planetary gear train according to various embodiments of the present invention.

In a planetary gear train according to various embodiments of FIG. 1, the third shaft TM3 is externally gear-meshed with the eighth shaft TM8 through the second transfer gear TF2, and the tenth shaft TM10 is selectively connected with the transmission housing H thereby selectively acting as a fixed element, as shown in FIG. 1. However, referring to FIG. 3, the third shaft TM3 is externally gear-meshed with the tenth shaft TM10 through the second transfer gear TF2, and the eighth shaft TM8 is selectively connected with the transmission housing H thereby selective acting as a fixed element, according to the various embodiments of FIG. 3.

As a result, the various embodiments of FIG. 3 differ from the various embodiments of FIG. 1 in that the shaft of the auxiliary shifting portion externally gear-meshed with the third shaft TM3 and the shaft of the auxiliary shifting portion selectively connected with the transmission housing are interchanged. However, a function and shift pattern of the gear train remains the same as will be obvious to a person of an ordinary skill in the art, which is therefore not described in further detail.

As described above, according to a planetary gear train of various embodiments of the present invention, at least nine forward speeds and at least one reverse speed are realized by a combination of four planetary gear sets, two transfer gears, and five control elements, thereby providing improvement of power delivery performance and fuel consumption and improving installability by shortening the length of an automatic transmission.

In addition, according to a planetary gear train of various embodiments of the present invention, two transfer gears of external gears arranged on the output shaft OS are employed in addition to three planetary gear sets, and thus, gear teeth may be widely varied so as to easily achieve optimum gear ratio and to easily comply with required performance for respective vehicles.

Furthermore, according to a planetary gear train of various embodiments of the present invention, a gear ratio span of more than 9.8 may be achieved while realizing at least nine forward speeds and at least one reverse speed, thereby maximizing an engine driving efficiency.

In addition, the linearity of step ratios of shift stages is secured while multi-staging the shift stage with high efficiency, thereby making it possible to improve drivability such as acceleration before and after a shift, an engine speed rhythmic sense, and the like.

For convenience in explanation and accurate definition in the appended claims, the terms "upper", "lower", "inner" and "outer", "up," "down," "upper", "lower," "upwards," "downwards", "front", "rear", "back", "inside", "outside", "inwardly," "outwardly," "interior", "exterior", "inner," "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    a first planetary gear set including first, second, and third rotational elements;
    a second planetary gear set including fourth, fifth, and sixth rotational elements;
    a third planetary gear set including seventh, eighth, and ninth rotational elements;
    a fourth planetary gear set including tenth, eleventh, and twelfth rotational elements;
    an input shaft mounted with the first, second, and third planetary gear sets at an external circumference of the input shaft;
    an output shaft disposed in parallel with the input shaft and mounted with the fourth planetary gear set on an external circumference of the output shaft;
    a first shaft fixedly interconnecting the first rotational element and the fourth rotational element;
    a second shaft fixedly connected with the second rotational element and fixedly connected with the input shaft;
    a third shaft fixedly interconnecting the third rotational element and the eighth rotational element, such that the third and eighth rotational elements always rotate at a same speed;
    a fourth shaft fixedly connected with the fifth rotational element and fixedly gear-meshed with the output shaft;
    a fifth shaft fixedly connected with the sixth rotational element, such that the fifth shaft always rotates at a same speed with the sixth rotational element;
    a sixth shaft fixedly connected with the seventh rotational element;
    a seventh shaft fixedly connected with the ninth rotational element;
    an eighth shaft fixedly connected with the tenth rotational element;
    a ninth shaft fixedly connected with the eleventh rotational element and fixedly connected with the output shaft;
    a tenth shaft fixedly connected with the twelfth rotational element; and
    transfer gears, each of which forming an external gear-mesh between a corresponding pair of shafts among the first to tenth shafts,
    wherein one shaft among the eighth and tenth shafts is selectively connected with a transmission housing and another shaft among the eighth and tenth shafts is gear-meshed with the third shaft.

2. The planetary gear train of claim 1, wherein:
    the first planetary gear set comprises a first sun gear as the first rotational element, a first planet carrier as the second rotational element, and a first ring gear as the third rotational element;
    the second planetary gear set comprises a second sun gear as the fourth rotational element, a second planet carrier as the fifth rotational element, and a second ring gear as the sixth rotational element;
    the third planetary gear set comprises a third sun gear as the seventh rotational element, a third planet carrier as the eighth rotational element, and a third ring gear as the ninth rotational element; and
    the fourth planetary gear set comprises a fourth sun gear as the tenth rotational element, a fourth planet carrier as the eleventh rotational element, and a fourth ring gear as the twelfth rotational element.

3. The planetary gear train of claim 2, wherein a pinion supported by the second planet carrier acting as the fifth rotational element is a 2-stage pinion including a smaller diameter portion and a larger diameter portion, and
    wherein the smaller diameter portion is gear-meshed with the second sun gear acting as the fourth rotational element, and the larger diameter portion is gear-meshed with the second ring gear acting as the sixth rotational element.

4. The planetary gear train of claim 1, wherein:
    the fifth shaft is selectively connected with the transmission housing;
    the sixth shaft is selectively connected with the first, second, and fifth shafts respectively; and
    the seventh shaft is selectively connected with the transmission housing.

5. The planetary gear train of claim 4, wherein:
    the eighth shaft is gear-meshed with the third shaft; and
    the tenth shaft is selectively connected with the transmission housing.

6. The planetary gear train of claim 5, wherein the transfer gears comprise:
    a first transfer gear disposed between the fourth shaft and the output shaft; and
    a second transfer gear disposed between the third shaft and the eighth shaft.

7. The planetary gear train of claim 5, further comprising:
    a first clutch disposed between the second shaft and the sixth shaft;
    a second clutch disposed between the first shaft and the sixth shaft;
    a third clutch disposed between the fifth shaft and the sixth shaft;
    a first brake disposed between the fifth shaft and the transmission housing;
    a second brake disposed between the seventh shaft and the transmission housing; and
    a third brake disposed between the tenth shaft and the transmission housing.

8. The planetary gear train of claim 4, wherein:
    the eighth shaft is selectively connected with the transmission housing; and
    the tenth shaft is gear-meshed with the third shaft.

9. The planetary gear train of claim 8, wherein the transfer gears comprise:
    a first transfer gear disposed between the fourth shaft and the output shaft; and
    a second transfer gear disposed between the third shaft and the tenth shaft.

10. The planetary gear train of claim 8, further comprising:
- a first clutch disposed between the second shaft and the sixth shaft;
- a second clutch disposed between the first shaft and the sixth shaft;
- a third clutch disposed between the fifth shaft and the sixth shaft;
- a first brake disposed between the fifth shaft and the transmission housing;
- a second brake disposed between the seventh shaft and the transmission housing; and
- a third brake disposed between the eighth shaft and the transmission housing.

11. A planetary gear train of an automatic transmission for a vehicle, comprising:
- a first planetary gear set including first, second, and third rotational elements;
- a second planetary gear set including fourth, fifth, and sixth rotational elements;
- a third planetary gear set including seventh, eighth, and ninth rotational elements;
- a fourth planetary gear set including tenth, eleventh, and twelfth rotational elements;
- an input shaft mounted with the first, second, and third planetary gear sets at an external circumference of the input shaft; and
- an output shaft disposed in parallel with the input shaft and mounted with the fourth planetary gear set on an external circumference of the output shaft,
- wherein the first rotational element is directly connected with the fourth rotational element,
- the second rotational element is directly connected with the input shaft,
- the third rotational element is directly connected with the eighth rotational element and gear-meshed with one rotational element among the tenth and twelfth rotational elements,
- the fifth rotational element is gear-meshed with the output shaft through a first transfer gear,
- the sixth rotational element is selectively connected with a transmission housing,
- the ninth rotational element is selectively connected with the transmission housing,
- the eleventh rotational element is directly connected with the output shaft, and
- a remaining rotational element, among the tenth and twelfth rotational elements, excluding the one rotational element gear-meshed with the third rotational element, is selectively connected with the transmission housing.

12. The planetary gear train of claim 11, wherein:
- the first planetary gear set includes a first sun gear as the first rotational element, a first planet carrier as the second rotational element, and a first ring gear as the third rotational element;
- the second planetary gear set includes a second sun gear as the fourth rotational element, a second planet carrier as the fifth rotational element, and a second ring gear as the sixth rotational element;
- the third planetary gear set includes a third sun gear as the seventh rotational element, a third planet carrier as the eighth rotational element, and a third ring gear as the ninth rotational element; and
- the fourth planetary gear set includes a fourth sun gear as the tenth rotational element, a fourth planet carrier as the eleventh rotational element, and a fourth ring gear as the twelfth rotational element.

13. The planetary gear train of claim 12, wherein a pinion supported by the second planet carrier acting as the fifth rotational element is a 2-stage pinion including a smaller diameter portion and a larger diameter portion,
- wherein the smaller diameter portion is gear-meshed with the second sun gear acting as the fourth rotational element, and the larger diameter portion is gear-meshed with the second ring gear acting as the sixth rotational element.

14. The planetary gear train of claim 11, wherein:
- the second rotational element is selectively connected with the seventh rotational element;
- the first rotational element is selectively connected with the seventh rotational element; and
- the sixth rotational element is selectively connected with the seventh rotational element.

15. The planetary gear train of claim 14, wherein the third rotational element is gear-meshed with the tenth rotational element through a second transfer gear, and the twelfth rotational element is selectively connected with the transmission housing.

16. The planetary gear train of claim 15, further comprising:
- a first clutch selectively connecting the second rotational element and the seventh rotational element;
- a second clutch selectively connecting the first rotational element and the seventh rotational element;
- a third clutch selectively connecting the sixth rotational element and the seventh rotational element;
- a first brake selectively connecting the sixth rotational element with the transmission housing;
- a second brake selectively connecting the ninth rotational element with the transmission housing; and
- a third brake selectively connecting the twelfth rotational element with the transmission housing.

17. The planetary gear train of claim 14, wherein the third rotational element is gear-meshed with the twelfth rotational element through a second transfer gear, and the tenth rotational element is selectively connected with the transmission housing.

18. The planetary gear train of claim 17, further comprising:
- a first clutch selectively connecting the second rotational element and the seventh rotational element;
- a second clutch selectively connecting the first rotational element and the seventh rotational element;
- a third clutch selectively connecting the sixth rotational element and the seventh rotational element;
- a first brake selectively connecting the sixth rotational element with the transmission housing;
- a second brake selectively connecting the ninth rotational element with the transmission housing; and
- a third brake selectively connecting the tenth rotational element with the transmission housing.

* * * * *